United States Patent

Kuntz

[11] Patent Number: 5,575,109
[45] Date of Patent: Nov. 19, 1996

[54] PLANT PROTECTION DEVICE

[76] Inventor: Mark E. Kuntz, 1409 W. Boulevard St., Kokomo, India. 46902

[21] Appl. No.: 439,469
[22] Filed: May 8, 1995
[51] Int. Cl.⁶ ..................................................... A01G 9/24
[52] U.S. Cl. ........................................ 47/22; 47/21; 47/26
[58] Field of Search .............................. 47/22, 21, 21 A, 47/23, 30, 30 OT, 70, 19, 26

[56] References Cited

U.S. PATENT DOCUMENTS

| 367,134 | 7/1887 | Culver. |
| 738,588 | 9/1903 | Woodworth. |
| 935,057 | 9/1909 | Roberts. |
| 1,082,439 | 12/1913 | Patterson. |
| 1,126,426 | 1/1915 | Eddy. |
| 1,155,313 | 9/1915 | Hogan. |
| 1,600,749 | 9/1926 | Barnes. |
| 1,820,040 | 8/1931 | Zuckerman. |
| 1,897,382 | 2/1933 | Blair. |
| 1,987,255 | 1/1935 | Husted. |
| 2,006,562 | 7/1935 | Scheu. |
| 2,835,078 | 5/1958 | Whitmore. |
| 2,953,870 | 9/1960 | Nelson. |
| 3,466,799 | 9/1969 | McComb Stilson. |
| 3,748,783 | 7/1973 | Sokolies. |
| 4,901,472 | 2/1990 | Donohue et al. ........................ 47/22 |

FOREIGN PATENT DOCUMENTS

| 2456465 | 1/1981 | France ........................ 47/22 |
| 1630667 | 2/1991 | U.S.S.R. ........................ 47/22 |

Primary Examiner—Terry Lee Melius
Assistant Examiner—Joanne C. Downs
Attorney, Agent, or Firm—Steven W. Kincaid

[57] ABSTRACT

A plant protection device includes a root protection barrier which may be heated and may include an inner shell and an outer shell, a cylindrical chamber capable of connecting to the root protection barrier which may be heated and may be formed from a plurality of interlocking segments, and a top dome which may be connected to the chamber such that a plant housed within the plant protection device is protected from the elements and has room to grow and expand naturally. Tropical plants and trees can thus be grown in colder climates with the chamber and top dome removed and easily stored during warmer periods of the year.

20 Claims, 3 Drawing Sheets

PLANT PROTECTION DEVICE

BACKGROUND OF THE INVENTION

1. Field of the Invention

This invention relates generally to plant and vegetation protection, and, more particularly, to the seasonal protection of plants and trees through the use of a structured device to create an artificial environment.

2. Description of the Prior Art

Plants, trees, and other vegetation have long been known to be susceptible to harsh, inclement and severe weather including cold temperatures, ice storms, strong winds, hail, or sleet. Currently, many plants and trees, such as tropical and citrus fruit trees as well as ornamental plants cannot be grown in many geographical regions since these plants cannot tolerate colder climates.

Many plant species which cannot tolerate the harsh climate, especially the cold, can be grown in large plant greenhouse structures such as those used by universities for teaching and research. Such greenhouse structures, however, require substantial space and financial resources. These greenhouses also cannot typically be assembled and disassembled easily allowing the plant to grow in a natural open environment during the warmer periods of the year. Thus, greenhouses are impractical for use by many small businesses, as well as residential and apartment dwellers interested in growing these plants in geographical regions susceptible to incompatible colder temperatures.

Several references in the art are known to shield plants partially from inclement weather. Various devices are known which are designed to protect above-ground portions of plants from cold air temperatures and frost. These references include U.S. Pat. No. 2,953,870 to Nelson; U.S. Pat. No. 1,082,439 to Patterson; U.S. Pat. No. 935,057 to Roberts; U.S. Pat. No. 738,588 to Woodworth; U.S. Pat. No. 367,134 to Culver; U.S. Pat. No. 1,126,426 to Eddy; U.S. Pat. No. 1,820,040 to Zuckerman; U.S. Pat. No. 1,600,749 to Barnes; U.S. Pat. No. 1,155,313 to Hogan; U.S. Pat. No. 1,897,382 to Blair; U.S. Pat. No. 2,835,078 to Whitmore; and U.S. Pat. No. 3,466,799 to Stilson. Other devices for protecting plants in cold climates which employ heating devices or elements to store and conserve heat are also known. U.S. Pat. No. 4,242,833 to Maes, Jr., teaches a greenhouse construction which utilizes a water layer which acts as a thermal storage medium during cold weather seasons. U.S. Pat. No. 4,642,938 to Georges et. al., teaches the use of a housing around the plant with a heat source. Additionally, U.S. Pat. No. 2,006,562 to Scheu shows an orchard heater having a shell placed around the tree and a means for a small flame within the shell. The protection of the root system is described by U.S. Pat. No. 1,987,255 to Husted which shows an inner ring slidably embedded in an outer ring.

Despite the advances of the prior art, the prior art has failed to provide a method to conveniently and economically protect the entire plant, including the roots, stem (or trunk) and foliage, from inclement weather and conditions, effectively combining protection for all of a plant in one plant protection device.

The prior art has further specifically failed to provide a plant protection device which may be easily assembled and disassembled around a plant as desired. The prior art has failed provide a plant protection device which can be conveniently stored when not needed. The prior art has further failed to provide a plant protection device including temperature control devices both for the air around the exposed plant and the soil around the roots below ground. The prior art has further failed to provide adequate root protection. A total plant protection device which screens selected wavelengths of light, maximizing solar heat, and maximizing retention of heat is also not known.

Additionally, no teaching is known which effectively prevents the soil surrounding the roots from freezing while promoting water supply and drainage to and from the roots. Further, the prior art has failed to provide a plant protection device which includes dual pots or protective shells for root systems which are not subject to excessive electrical charge, which may result in electrical waves though the soil surrounding the roots and which may cause root damage.

Therefore, it is an object of the present invention to provide a total plant protection device which will effectively protect plant species from cold and inclement weather. It is a further object of this invention to provide a segmented device which will fit together to accommodate convenient storage and protect plant species of various shapes and heights. It is still a further object of this invention to provide a protective device which transmits light through the protection device to the plant while still providing thermal insulation to retain heat as needed. It is still a further object of the present invention to provide a protection device which can effectively control the air temperature and soil temperature around the plant. It is still a further object to provide a root protection system which prevents the soil around the roots from freezing, promotes water drainage from snow and ice on the ground surface to the roots, and allows the roots to grow and expand below the freeze-line. It still is a further object of the present invention to provide a root protection device substantially resistant to electrical waves and charges which may harm the roots of a plant.

SUMMARY OF THE INVENTION

One embodiment of the plant protection device of the present invention includes: a root protection barrier around the roots of a plant wherein the root protection barrier extends from a determined depth below the surface of the ground to the surface of the ground; a cylindrical chamber which is capable of securely attaching to the root protection barrier and which extends vertically around a plant stem; a top dome which is capable of securely attaching to the cylindrical chamber to enclose the plant protection device and a temperature control device for controlling a) the temperature of the air within the cylindrical chamber and of air within the top dome and;

b) the soil temperature within the root protection barrier.

The root protection barrier may include an inner shell and an outer shell both extending vertically into the soil to a depth at which the soil will not freeze with the roots of a plant substantially contained within the inner shell. Preferably, the outer shell is held a constant distance from the inner shell by at least one support bar. Also preferably, the inner shell and the outer shell are both annular and concentric in relation to each other. The inner and outer shells also preferably each are solid from the ground surface down to a predetermined depth, most preferably twelve to eighteen inches, and thereafter downwardly form randomly spaced orifices to allow for water and nutrient movement through the root protection barrier. The bottom of the inner shell and the outer shell of the root protection barrier is further preferably open so that the roots of a plant can grow downwardly below a depth at which the soil will typically not freeze in a given geographic location. The inner and outer shells are even more preferably constructed of a material resistant to electrical conduction to minimize electrical waves within the soil surrounding the roots of a plant. The inner annular shell and the outer annular shell are additionally preferred to be constructed from a thermoplastic. A thermostat may be attached to the thermostat control device so that the temperature of the soil within the root protection barrier may be continuously controlled.

In one embodiment of the present invention, at least one soil heater unit is encompassed by the root protection barrier, although a soil heater unit may be attached to an outer surface of the inner shell. More preferably, the soil heater unit includes heater coils embedded within at least one of the inner shell and outer shell. Most preferably, heater coils are molded within the inner shell and the outer shell to increase heat distribution throughout the soil surrounding the plant roots while utilizing lower heat.

The cylindrical chamber may preferably be formed of a plurality of interlocking segments each of which are capable of securely connecting with an adjacent lower segment and an adjacent upper segment to form the continuous cylindrical chamber. A lower most segment is capable of securely attaching to an upper rim of the inner shell of the root protective barrier. The cylindrical chamber may preferably be constructed from a material selected from the group consisting of plexiglass, polycarbonate resin, and polystyrene resin. Even more preferably, the cylindrical chamber is constructed of materials capable of screening harmful wavelengths of light. The cylindrical chamber also may include one or more openings for air communication into and out of the cylindrical chamber. Most preferably, one or more tubular structures are utilized for such air communication. These tubular structures are placed high enough along said cylindrical chamber so as to not be clogged by accumulated or drifting snow.

Additionally, an air heating unit may be mounted outside, inside, or preferably within said cylindrical chamber. More preferably, a thermostat may be attached to the air heating unit so that the air temperature within the cylindrical chamber and top dome may be continuously controlled, either manually or by well known thermostatic methods. Also preferably, the air heating unit includes a blower or fan to better circulate heated air.

The top dome may be capable of locking onto a top rim of the upper-most segment of the cylindrical chamber to form an enclosure of a plant above the ground surface. The top dome may also preferably contain a lower hemisphere and an upper hemisphere which may be connected together. The lower hemisphere preferably defines a lower circular opening concentric with an inner surface of the cylindrical chamber. The lower hemisphere may be securely attached to the uppermost segment of the cylindrical chamber thereby allowing a plant to grow through the opening into the top dome. The upper hemisphere may also be preferably securely attached to said lower hemisphere. The upper hemisphere even more preferably defines a lower flange defined by an outer surface of the upper hemisphere which is capable of securely connecting with an upper annular rim of the lower hemisphere to form the top dome when connected and allows the enclosed plant to be exposed to outside air and direct sunlight when not connected. Most preferably, the hemisphere is tinted green and made from plexiglass.

DETAILED DESCRIPTION OF THE INVENTION

Figure 1:
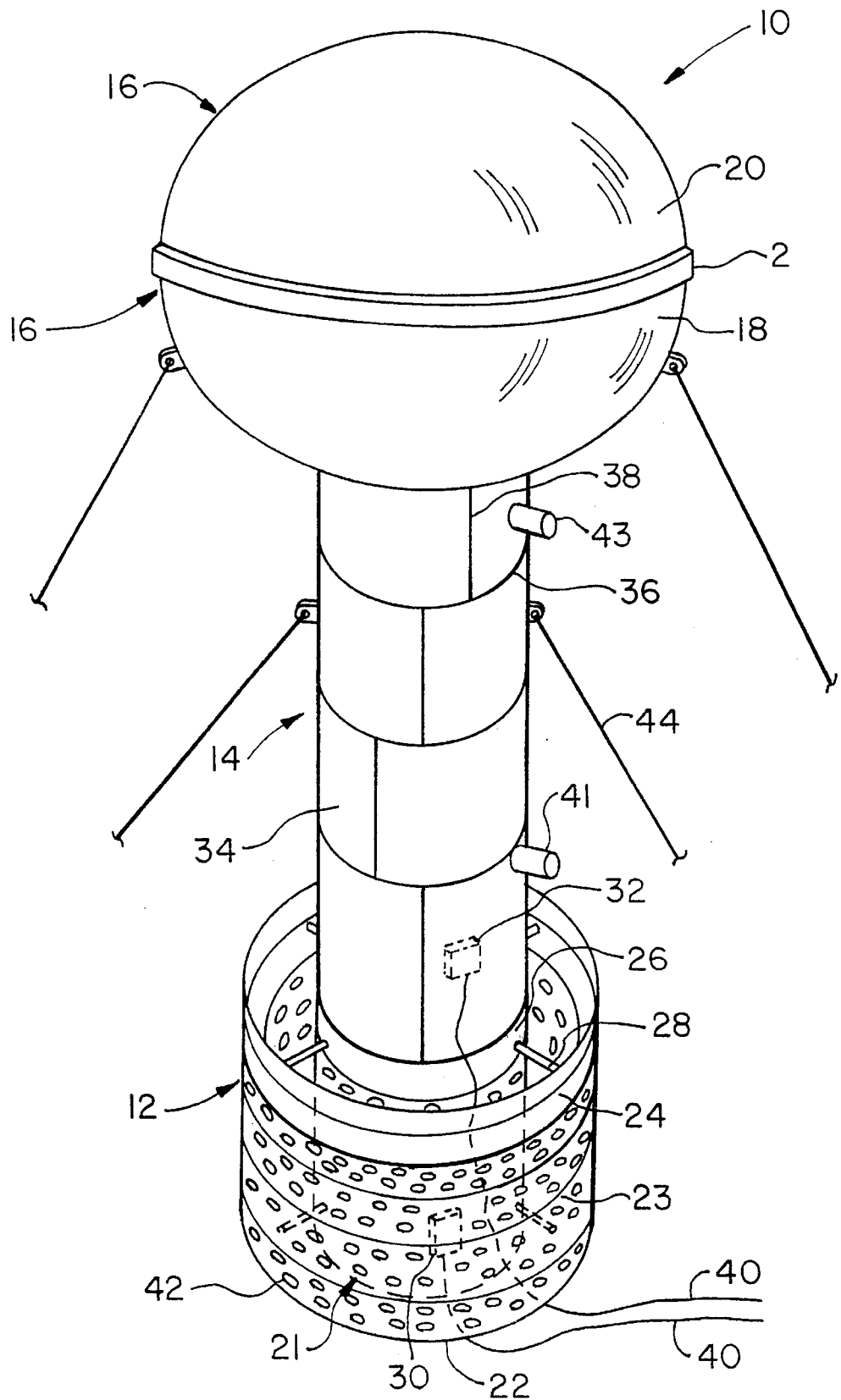
FIG. 1 is a perspective view of one embodiment of the plant protector device of the present invention.
Figure 2:
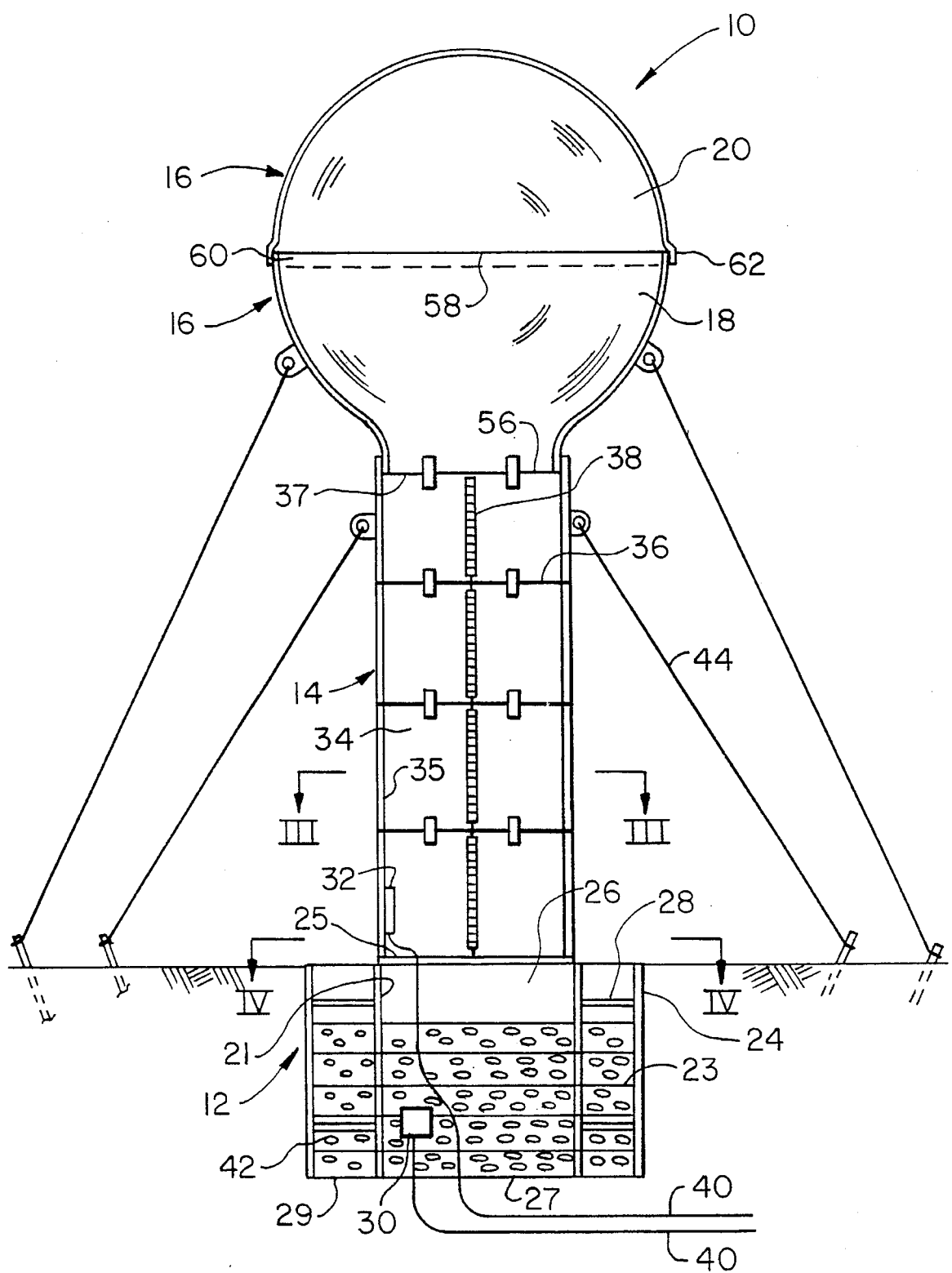
FIG. 2 is a side view of the plant protector device of FIG. 1.
Figure 3:
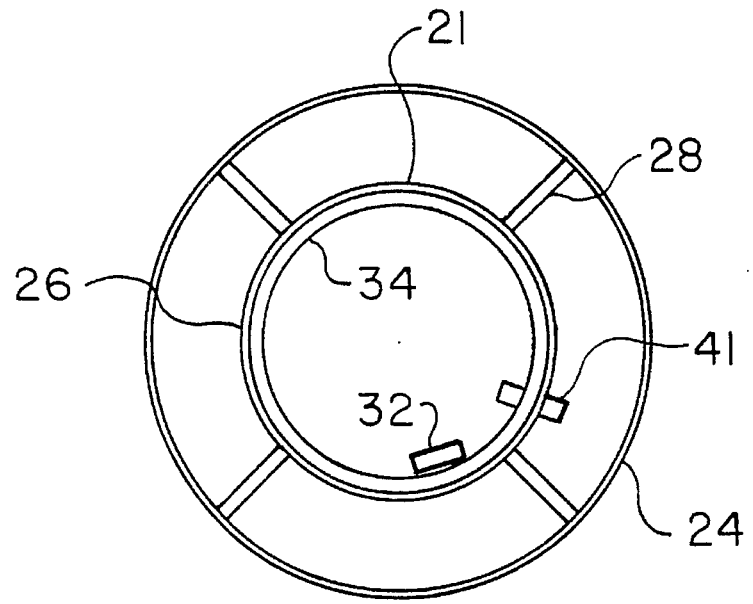
FIG. 3 is a cross-sectional view of the plant protection device taken along line III—III of FIG. 2.
Figure 4:
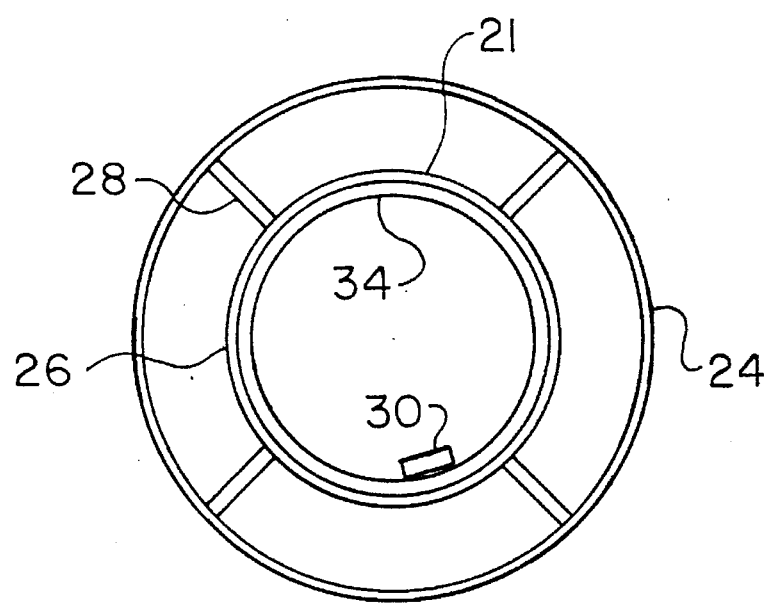
FIG. 4 is a cross-sectional view of the plant protection device taken along line IV—IV of FIG. 2.

One presently preferred embodiment of the plant protection device of the present invention, designated generally by reference numeral 10, is depicted in FIGS. 1-4. The plant protection device 10 may include a root protection barrier 12 which is positioned at or below the surface of the earth and extends downwardly. A cylindrical chamber 14 may be securely attached to the root protection barrier 12 such that the cylindrical chamber 14 projects substantially vertically upward above the ground surface in a column-like fashion. A soil heating unit 30 may be attached to the root protection barrier 12 or more preferably, embedded within the root protection barrier 12. The soil heating unit can be utilized to control the soil temperature surrounding the roots of a plant through manual operation or well known thermostatic methods. An air temperature control device such as an electrical air heater unit 32 with a fan/blower for controlling the air temperatures within the plant protection device also may be attached to an inner surface 35 of the cylindrical chamber 14 to radiate heat within the cylindrical chamber 14 and a top dome 16 which may be securely attached to the cylindrical chamber 14. The top dome 16 serves to retain heat emitted from the air heater unit 32 and to substantially enclose any portions of a plant which would otherwise be exposed to the elements.

The root protection barrier 12 may include a double layer of protection, an inner shell 21 and an outer shell 22. In one preferred embodiment, the inner shell 21 and outer shell 22 are concentric about each other and annularly shaped. The inner shell 21 and outer shell 22 each further preferably form solid regions 26, 24 respectively down from the ground surface to a predetermined level, preferably twelve to eighteen inches below the ground surface, and thereafter form randomly spaced orifices 42 to allow water and nutrient movement in, out, and through the inner shell 21 and the outer shell 22. Moreover, the root protection barrier 12 may terminate at a bottom rim 27 of the inner shell 21 and a bottom rim 29 of the outer shell 22 of preferably equal depth such that the roots of a plant may extend unobstructed below the root protection barrier 12. Additionally, the inner shell 21 and outer shell 22 may be maintained at a substantially constant distance by at least one support rod 28 positioned between the inner shell 21 and the outer shell 22. The root protection barrier 12 may also be permanently embedded within the soil with an uppermost part 26 of the inner shell 21 and an uppermost part 24 of the outer shell 22 at or barely protruding out the earth's surface. This uppermost part 26 of the inner shell 21 may form a connecting lip 25 for securely attaching the cylindrical chamber 14 to the inner shell 21. The connecting lip 25 can be any effectuated conventional design including a tongue and groove arrangement, a threaded segment, one or more latches, or any other device which will allow the cylindrical chamber 14 to be slid over and securely attached to the root protection barrier 12.

Most preferably, the inner shell 21 and the outer shell 22 may be constructed from a flexible, engineering thermoplastic and constructed of one or more materials and yet which can withstand the long-term effects of a heater in contact therewith. Electrical feed lines 40 can be used to supply a heater electricity from any suitable power source, preferably through a rheostat.

The means for controlling the soil temperature of this presently preferred embodiment of the plant protection device 10, may include an electrical soil heating unit 30. The soil heating unit 30 may be attached to one of the inner shell 21 and outer shell 22. More preferably, the soil heating unit 30 may include heating coils 23 molded within each of the inner shell and the outer shell 22 of root protection barrier 12. Most preferably, the inner shell 21 and the outer shell 22 both contain heating coils 23 with the heating coils 23 in the outer shell capable of producing more heat than those of the inner shell 21. This arrangement allows a lower grade heat to be used while warming a greater volume of soil. A thermostat may also be preferably connected to the soil heating unit 30 such that soil temperature can be continuously regulated as desired.

A cylindrical chamber 14 may be securely attached to the above-described connecting means to form a vertical upwardly extending column-like cylindrical chamber 14. One embodiment of the present invention utilizes a series of stacked cylindrical segments 34 interconnected to form the continuous cylindrical chamber 14. Each segment includes an upper edge 36 and a complementary lower edge 37. An upper edge 36 of one segment can be securely connected with a lower edge 37 of another segment through any well known tongue and groove arrangement. Thus, the upper edge 36 can be securely interconnected with the lower edge 37 of the next upper segment 34 in a repetitious manner to form a cylindrical chamber 14 of any desired height. As stated above, the lowest segment 34 may also be securely attached to the connecting lip 25 of the inner shell 21 of the root protection barrier 12. Preferably, the segments 34 are secured by a plurality of latches 38 mounted on the segments 34 to physically restrain and bind the segments 34 together. It is to be understood however, that any number of binding arrangements could be utilized, such as tongue and groove arrangements, threaded segments, and bolts, to securely interconnect the segments. It is also understood that while annular segments are preferred, segments of various shapes may be utilized to accommodate the needs of the user.

In another preferred embodiment of the present invention, the segments 34 are substantially rigid and annular such that the annular shape is maintained at all times. As shown in FIG. 1, each segment 34 includes a seam 38. The seams of several segments 34 may be aligned for cosmetic reasons although such alignment is not necessary.

An air temperature control means may also be provided to control the air temperature within the cylindrical chamber 14 and top dome 16. The air temperature control means preferably includes at least one electrical heating unit 32 capable of radiating heat throughout the cylindrical chamber 14 and top dome 16. This is best accomplished with a blower or fan attached to the heating unit 32. Even more preferably, the air heating unit 32 is connected to any known conventional thermostat to allow continuous regulation of the air temperature within the cylindrical chamber 14 and top dome 16. Power to the soil heating unit 30 and air heating unit 32 may be supplied by any known conventional methods including batteries and electrical lines from solar storage units, geothermal storage units, generators, and local utilities. A rheostat may further be used to control current flow as desired. Additionally, the cylindrical chamber may contain one or more openings to allow for air communication in and out of the cylindrical chamber. Preferably, tubes can be used to better control the air passing into the cylindrical chamber. When a fan is used to circulate heat, it is preferable to have a lower tube 41 to bring air into the chamber and an upper tube 43 to serve as a conduit for exiting air. These tubes 41, 43 should be above the ground sufficiently to prevent clogging from snow and ice. This tubal arrangement facilitates carbon dioxide supply to the housed plant and oxygen removal from the cylindrical chamber, while preventing unwanted pressure build-up within the plant protection device 10.

The top dome 16 may also be securely attached to the upper edge 36 of an uppermost segment 34, just as used to securely hold the segments 34 together. One embodiment of the present invention utilizes a top dome 16 which is substantially global in shape and includes a lower hemisphere 18 and an upper hemisphere 20. The lower hemisphere 18 is substantially semi-spherically shaped and forms a lower circular rim 56 contiguous with the cylindrical chamber 14 and which provides for air communication with the cylindrical chamber 14. The lower hemisphere 18 also includes an upper annular rim 58 which defines an equator 60 of the top dome 16. A semi-spherical upper hemisphere 20 may include a lower flange 62 which fits snugly around the upper annular rim 58 to make the upper hemisphere 20 capable of snapping securely around the annular rim 58 of hemisphere 18. The upper and lower hemispheres 18, 20 may also be securely bound together by any conventional means along the equator 60, much as latches, tongues, and groove arrangements, threaded arrangements, and adhesive materials. Preferably, the top dome 16 is constructed from a material resistant to impact and which still allows light transmittance. Polycarbonate resins and plexiglass are particularly preferred. Even more preferably, the upper hemisphere 20 may be tinted, allows upper plant foliage room and space to branch out, and may screen or reflect selected wavelengths of light. Additionally, the lower hemisphere 18 may be securely attached to the cylindrical chamber 14 by any well known conventional method including compatible threaded arrangements, tongue and groove arrangements, latch and key, and the use of pins through selected openings of the lower hemisphere into the cylindrical chamber 14.

The plant protection device 10 when constructed as described above may be provided additional stability by guy wires 44 anchoring the cylindrical chamber 14 and top dome 16 to the ground. Further stability may be added to the plant protection device 10 by constructing it from engineering plastics, resistant to impact and which tend to sway in high wind rather than cracking under high stress.

One embodiment of the present invention is advantageous as it allows the plant such as a Palmetto Palm tree, various tropical plants, and various tropical fruit trees and plants to be planted in the soil within the inner shell 22. The roots may grow downwardly in a free manner without being encumbered by any lower boundary or even a mesh covering which may clog easily. The root protection barrier 12 promotes drainage to and from the plant roots. Snow and ice may accumulate on the ground surface outside of the cylindrical chamber 14. The soil heated by the soil heating unit 30 will promote the melting of snow and ice, allowing water and nutrition to flow into the root protection barrier. The root protection barrier is preferably solid from the ground surface to a predetermined depth, and thereafter forms orifices 42 to facilitate water drainage and nutrient movement to and around the plant roots. The trunk of a plant which is above ground is further housed within the cylindrical chamber 14, which is formed by wrapping individual segments 34 around the plant and interconnecting the segments 34. This allows the cylindrical chamber 14 to be formed to any desired height. The cylindrical chamber 14 and top dome 16 further provide an artificial environment, protecting the plant from cold weather, storms, and even the long term effect of some rays of the sun.

Additionally, because the various component parts of the preferred embodiment described above are interlocking, storage is facilitated during warmer periods of the year while reducing necessary set-up time, costs, and manpower.

Moreover, the various attributes of the present invention allow corporate offices and private individuals to landscape their properties and lawns with a wide variety of plants and trees not found in various geographical areas. Shopping malls can add these plants to their parking lots. Commercial fruit producers and novice gardeners alike may also grow citrus crops outside of the southern regions of the United States. The present invention is intended to be easily dismantled after the threat of cold temperatures pass for the season. The plant or tree would then be open to the weather conditions that are not harmful to such a plant or tree, and would be subject to normal growth for the remaining season. An example of the use of this invention would be that palmetto palms or orange trees could be grown in locations such as Atlanta, Ga. The climate in Atlanta, Georgia would allow such tropical plants to survive if they were protected from cold weather elements for approximately 4–6 weeks in the winter. This invention would protect both the upper portion of the plant as well as the root area during the cold period. After the threat of cold weather is over, the upper portion of this invention would be dismantled and stored away until the next cold weather period. The soil heating devices would remain below ground although, not in use until needed the following winter. During the spring, summer, and fall, the palm or orange tree would grow and be useful as if located in Miami, Fla.

While specific embodiments of the present invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

I claim:

1. A plant protection device comprising:
   a) a root protection barrier capable of surrounding the roots of a plant, wherein said root protection barrier extends from a determined depth below the surface of the ground to the surface of the ground;
   b) a cylindrical chamber capable of securely attaching to said root protection barrier, wherein said cylindrical chamber extends substantially vertically;
   c) a top dome which is capable of securely attaching to said cylindrical chamber to substantially envelope a plant;
   d) a temperature control means for controlling the temperature of air contained within said cylindrical chamber and contained within said top dome; and
   e) a temperature control means for controlling the soil temperature within said root protection barrier.

2. The plant protection device of claim 1 wherein said root protection barrier includes an inner shell and an outer shell both extending vertically into the soil to a depth at which the soil will not freeze such that the roots of a plant are substantially contained within the inner shell and wherein said outer shell is held a constant distance from said inner shell by at least one support bar.

3. The plant protection device of claim 1 wherein said cylindrical chamber and top dome may be removed and reconstructed as needed.

4. The plant protection device of claim 1 wherein said cylindrical chamber includes a plurality of interlocking segments which may be added as desired to accommodate plants of various heights and sizes.

5. The plant protection device of claim 2 wherein said inner shell and outer shell each form a separate solid enclosure region from the ground surface downward to a selected depth and thereafter each form randomly spaced orifices below said solid enclosure region to protect plant roots near the ground surface and allow for water and nutrient drainage.

6. The plant protection device of claim 5 wherein said selected depth is twelve to eighteen inches.

7. The plant protection device of claim 1 wherein said top dome includes a lower hemisphere and an interlocking upper hemisphere.

8. A plant protection device comprising;
   a) a subsurface root protection barrier which includes an outer annular shell held fixed at a constant distance from an inner annular shell by at least one support bar positioned between said outer and inner annular shells and wherein an inner root protection zone is encompassed by said inner annular shell and is in communication with an outer root protection zone, defined by the region between said outer and inner annular shells, and wherein said inner annular shell and outer annular shell are each solid from the ground surface to a predetermined depth and thereafter form orifices to facilitate water drainage within said inner annular shell;
   b) at least one soil heater unit encompassed by said subsurface root protection barrier;
   c) a cylindrical chamber formed from a plurality of segments extending from the ground surface upward, wherein a bottom segment is capable of interlocking with a lip of said root protection barrier to secure said cylindrical chamber to said root protection barrier and wherein each of said segments are capable of interlocking with one another to form said cylindrical chamber;
   d) an air heater attached to an interior surface of said cylindrical chamber; and
   e) a top dome which locks onto an top rim of an upper-most segment of said cylindrical chamber to form a substantial enclosure of a plant above the ground surface.

9. The plant protection device of claim 8 wherein said subsurface root protection barrier includes an inner annular shell and an outer annular shell each of which form a solid enclosure region from the ground surface downwardly to a uniform depth and thereafter each define spaced orifices below said solid enclosure region to protect plant roots near the ground surface and allow for water and nutrient drainage, and wherein said root protection barrier is open at a bottom rim of said inner annular shell and at a bottom rim of said outer annular shell such that roots can grow downwardly below a depth at which the soil will typically freeze in a given geographic location.

10. The plant protection device of claim 8 wherein said soil heater unit includes a plurality of heater coils molded within each of said inner annular shell and outer annular shell such that heat may be radiated from said outer annular shell without allowing plant roots to directly contact said coils.

11. The plant protection device of claim 9 wherein said inner annular shell and said outer annular shell are constructed from a thermoplastic.

12. The plant protection device of claim 9 wherein said uniform depth is twelve to eighteen inches.

13. The plant protection device of claim 9 wherein said top dome includes:
   a) a lower hemisphere with a central open annular ring capable of connecting to an uppermost segment of said cylindrical chamber such that a plant can grow within said cylindrical chamber and through said annular ring; and
   b) an upper hemisphere which is capable of interlocking with said lower hemisphere of said top dome.

14. The plant protection device of claim 13 wherein said top dome is constructed from a plexiglass and said upper hemisphere of said top dome is tinted.

15. A plant protection device comprising:
   a) a root protection barrier extending from the surface of the ground to at least a depth below the freeze line for a given geographic location, wherein said root protection barrier includes an inner annular shell and a concentric outer annular shell held apart at a fixed distance by a plurality of support rods between said inner and said outer annular shell and wherein said inner annular shell and outer annular shell each form a separate solid enclosure region from the ground surface downward to a selected depth and thereafter each form spaced orifices below said solid enclosure region to protect plant roots near the ground surface and allow for water and nutrient drainage;
   b) heating coils contained within each of said inner annular shell and said outer annular shell such that the area within said root protection barrier does not freeze;
   c) a vertical chamber which includes a plurality of interconnecting segments wherein said vertical chamber is capable of connecting onto an uppermost rim of said inner annular shell, wherein said interconnecting segments each have a first vertical side and a second vertical side which are capable of being secured along said first and second vertical sides together around a plant to form an endless annular segment around the plant of desired height, and wherein said vertical chamber includes a plurality of exchange tubes to allow for air communication into and out of the vertical chamber;
   d) a top dome including a lower annular hemisphere having a lower edge which is capable of interconnecting with an upper edge of an uppermost segment of said vertical chamber and having an upper rim capable of interconnecting with a lower flange of an upper hemisphere; and
   e) an air heating unit with blower fan mounted within said vertical chamber capable of controlling the air temperature within said vertical chamber and top dome.

16. The plant protection device of claim 15 wherein said inner annular shell and said outer annular shell are resistant to electrical charge and serve to retard electrical waves potentially damaging to a plant.

17. The plant protection device of claim 15 wherein said upper hemisphere is tinted green.

18. The plant protection device of claim 15 wherein the areas within said inner annular shell and said outer annular shell are in communication through randomly spaced orifices formed in said shells.

19. The plant protection device of claim 15 wherein said inner annular shell is solid for the upper twelve to eighteen inches and said outer annular shell is solid for the upper twelve to eighteen inches with randomly spaced orifices formed in said inner and outer annular shells below said solid enclosure region.

20. The plant protection device of claim 16 wherein said vertical chamber is constructed from a material selected from the group consisting of plexiglass, polycarbonate resin, and polystyrene resin.

* * * * *

UNITED STATES PATENT AND TRADEMARK OFFICE
CERTIFICATE OF CORRECTION

PATENT NO. : 5,575,109
DATED : November 19, 1996
INVENTOR(S) : Mark E. Kuntz

It is certified that error appears in the above-indentified patent and that said Letters Patent is hereby corrected as shown below:

On the title page item [76], line 2, "India" should read --Indiana--

Signed and Sealed this

Fourteenth Day of July, 1998

Attest:

BRUCE LEHMAN

Attesting Officer      Commissioner of Patents and Trademarks